(No Model.)
S. FADER.
BACK PEDALING BRAKE.
No. 603,325. Patented May 3, 1898.
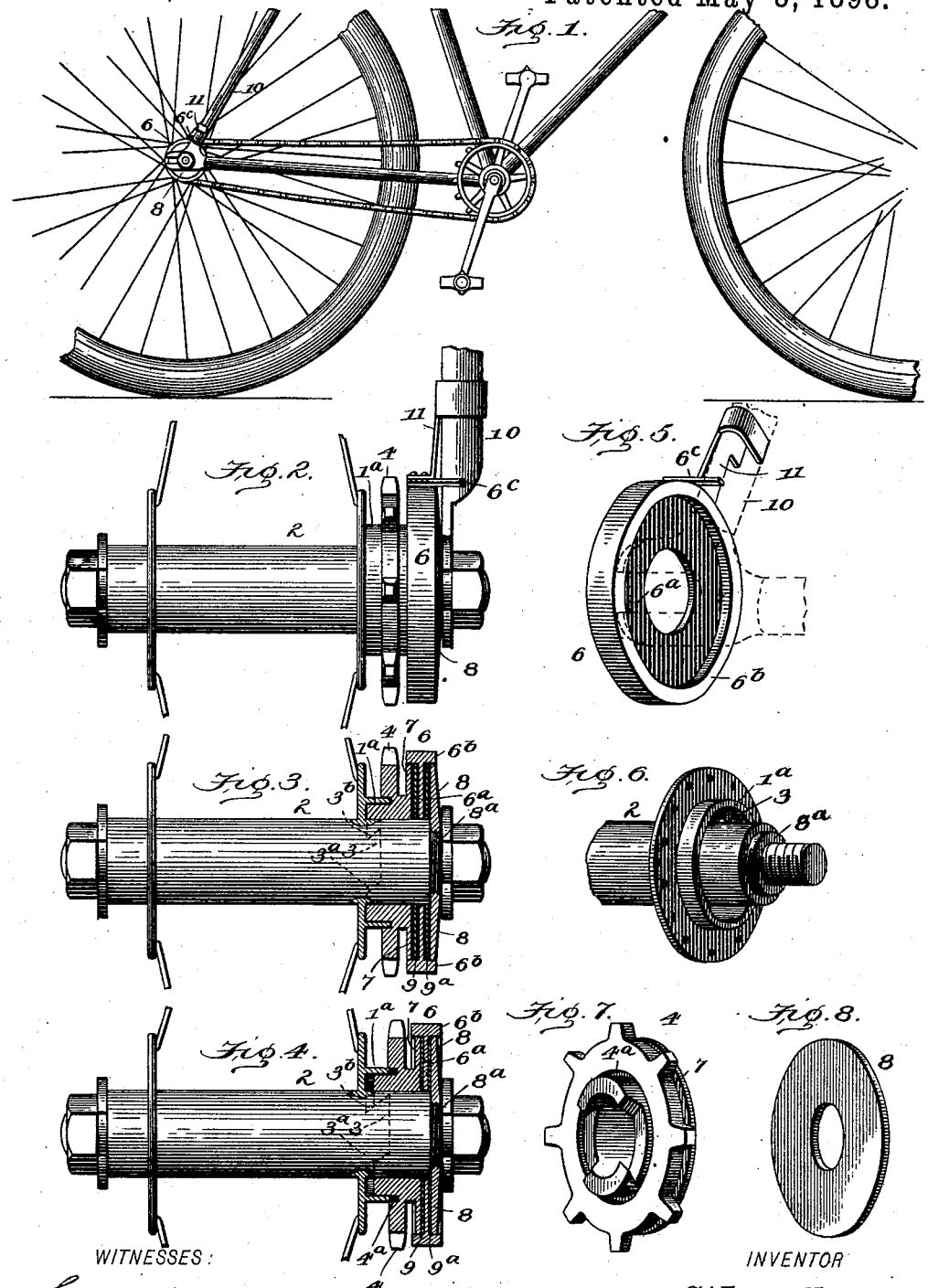
WITNESSES:
Edwin L. Bradford
N. Gillis
INVENTOR
Silas Fader
BY
Fred G. Dieterich & Co.
ATTORNEYS

UNITED STATES PATENT OFFICE.

SILAS FADER, OF VANCOUVER, CANADA, ASSIGNOR OF ONE-HALF TO ADOLPHUS WILLIAMS AND JOHN T. CARROLL, OF SAME PLACE.

BACK-PEDALING BRAKE.

SPECIFICATION forming part of Letters Patent No. 603,325, dated May 3, 1898.

Application filed October 13, 1897. Serial No. 655,045. (No model.)

*To all whom it may concern:*

Be it known that I, SILAS FADER, a citizen of the Dominion of Canada, residing at Vancouver, in the Province of British Columbia, Canada, have invented a new and Improved Brake Mechanism for Bicycles, of which the following is a specification.

This invention relates to brake mechanism for bicycles and similar vehicles in which a retarding power on the drive mechanism (such as back-pedaling) serves to impede the forward movement of the wheel proportionate to the amount of retarding action applied, and such invention more particularly refers to such forms of brake mechanism adapted for use on the rear or drive axle of the machine.

This invention primarily has for its object to provide a braking means of this character of a very simple nature, which can be economically manufactured, readily applied to the ordinary makes of bicycles now in general use, which will effectively serve for its intended purpose, and which can be operated by a novice as well as an experienced rider.

Another object of this invention is to provide a friction-brake mechanism of this character in which the lateral movement of the sprocket-wheel is reduced to a minimum to effect a full braking action practically to such a limited extent that the chain will maintain substantially a true alinement at all times.

My invention comprehends, broadly, the employment of a disk-plate fixedly held on the hub to turn therewith, a laterally-movable sprocket-wheel having a clutch means on one face to engage clutch members on the hub and a friction-disk face, and a supplemental friction-disk loosely held upon the wheel-hub intermediate the sprocket-wheel friction-face and fixed friction-disk, whereby to present duplex friction-contacts to retard the movement of the hub and wheel.

In its subordinate features this invention consists in the peculiar combination and novel arrangement of parts, such as will be first described in detail, and then be specifically pointed out in the appended claims, reference being had to the accompanying drawings, in which—

Figure 1 is a side elevation of a portion of a bicycle with my improvements applied. Fig. 2 is a rear elevation illustrating the axle and hub of the driving-wheel, the sprocket-brake disk-plate, and its frame-connecting devices. Fig. 3 is a longitudinal section of the parts shown in Fig. 2, the sprocket-wheel being shown in its normal position. Fig. 4 is a similar view illustrating the parts in their braking position. Fig. 5 is a detail view of the disk-plate. Figs. 6, 7, and 8 illustrate, respectively, a portion of the drive-axle hub and spindle, the sprocket-wheel with the inner disk, and the outer friction-disk.

In the accompanying drawings, in which like numerals indicate like parts in all the figures, 1 indicates the drive-axle; 2, the hub-section which carries the drive-sprocket.

The hub-flange $1^a$ is provided with raised clutch teeth or sections 3, having at one end an outer incline $3^a$ and at the other an undercut incline $3^b$, as clearly shown in Figs. 3 and 4.

4 indicates the drive sprocket-wheel loosely held on the hub, which has its inner face provided with similar clutch-teeth, which when the parts are assembled engage the teeth 3 on the hub and with same form the clutch connection for locking the wheel and hub together on the forward motion of the drive sprocket-wheel. The inner face of the sprocket is also provided with an annular recess $4^a$, in which projects a rim 5, secured to or integrally formed with the hub $1^a$, which serves as dust-guard, as it keeps all foreign matter from entering between the hub and sprocket-wheel.

While I have shown the sprocket-wheel formed with a recess and the rim 5 secured to the hub, it is obvious the relation of such parts may be reversed and the recess be in the hub and the rim in the sprocket-wheel.

6 indicates what I term the "fixed" disk-plate, such term being, however, only used in distinguishing it from the disk-plate 7, secured or formed integral with the sprocket-wheel, and the supplemental friction-disk 8, detachably secured to but held to turn with the hub.

The plate 6 consists of a centrally-apertured body $6^a$, having at its periphery a rim $6^b$, which projects laterally at each side over the body $6^a$ to form annular pockets to receive the disk members 8 and 7, as also interposed packing-rings 9 9ª, of leather or other suitable material.

The plate 6 in practice is held suspended loosely over the hub-spindle and stationary so far as relates to a rotary action, it having a projecting lug 6ᶜ, which contacts with the frame-fork 10, as clearly shown in Fig. 1.

The fixed disk 6 is held suspended on a stout spring-arm 11, the upper end of which is secured to the rear frame-bar 10. The tension of the spring-arm 11 is such as to normally move the plate toward the sprocket-wheel, so that under normal conditions it will keep such wheel in proper positive clutch connection with the hub.

The disk 8 is secured on the reduced left-threaded end 8ª of the hub-spindle, so as to rotate with it without danger of becoming detached.

In operation when it is desired to apply the brake the rider in the act of back-pedaling checks the forward direction of the sprocket-wheel 4 and causes it to have a slight backward movement on the hub. This reverse action, through the medium of the inclined clutch-teeth, causes the sprocket to move laterally against the disk-plate 6. Now as the pressure is thus applied against the disk 6 at one side its opposite side makes frictional contact with disk 8, and thereby exerts a second frictional resistance on the hub, as the disk 8 is fixedly held from lateral movement thereon. Thus it will be seen that the disks at each side of the disk-plate 6 will bear against the said plate and thereby take off any undue lateral strain thereon, as the pressure is equalized from opposite sides. Furthermore, by providing a double frictional contacting means, as described, a retarding action is also effected on the spindle-hub direct through the medium of the disk 8 as well as indirect through the engagement of the clutch-teeth of the sprocket and the hub. Again, as a double frictional resistance is effected against the disk 6 from both sides, it follows that a very small amount of movement of the sprocket-wheel will effect a braking action on the hub through the two distinct retarding means equal to two or three times the lateral movement of the sprocket against a single rigidly-held friction-disk.

The action of the brake devices is entirely automatic and the same controlled by the back-pedaling pressure of the rider in checking the forward movement of the wheel.

Having thus described my invention, what I claim, and desire to secure by Letters Patent, is—

1. In a bicycle brake mechanism, the combination with the drive-axle hub, having a clutch-face, a friction-disk detachably secured thereon and rotatable therewith, a sprocket-wheel having a clutch-face at one side and a friction-face at the other and loosely mounted on the hub, of a non-rotatable disk member interposed between the sprocket-wheel friction-disk and the hub friction-disk and adapted to be engaged on opposite sides by the said fixed disk and sprocket-disk when the movement of the sprocket-wheel is retarded, substantially as shown and for the purposes described.

2. In a bicycle brake mechanism, the combination with the drive-axle and the hub, said hub having a clutch-face, and a disk rotatable therewith but held from lateral movement, of a sprocket-wheel having a clutch-face and a friction-face, a friction member held between the sprocket-wheel and the rotatable friction-disk adapted to be engaged on its opposite sides by the said rotatable friction-disk and the sprocket-wheel friction-face, as the movement of such wheel is checked, as specified.

3. In a bicycle-brake of the class described, the combination with the drive-axle, the hub having wedge clutch members and a portion having left threads, the disk 8 fitted on such threaded portion, the laterally-movable sprocket having wedge clutches at one side and a fixed friction-disk 7 at the other, the disk 6, having a limited lateral movement on the hub and held between the disks 7 and 8, said disk 6, having a spring-hanger 11 connected with the machine-frame, and a stop 6ᶜ to engage a fixed portion of the machine, said disk having recesses on opposite sides, and the packing-rings held in the pockets of the disks 6, all being arranged substantially as shown and described.

SILAS FADER.

Witnesses:
OSWALD MOSELEY,
W. C. BROWN.